(12) United States Patent
Peeters et al.

(10) Patent No.: US 7,500,110 B2
(45) Date of Patent: Mar. 3, 2009

(54) METHOD AND ARRANGEMENT FOR INCREASING THE SECURITY OF CIRCUITS AGAINST UNAUTHORIZED ACCESS

(75) Inventors: Adrianus Marinus Gerardus Peeters, Eindhoven (NL); Markus Feuser, Hamburg (DE)

(73) Assignee: NXP B.V., Eindhoven (NL)

( * ) Notice: Subject to any disclaimer, the term of this patent is extended or adjusted under 35 U.S.C. 154(b) by 416 days.

(21) Appl. No.: 10/319,894

(22) Filed: Dec. 13, 2002

(65) Prior Publication Data
US 2003/0154389 A1 Aug. 14, 2003

(30) Foreign Application Priority Data
Dec. 19, 2001 (DE) ................ 101 62 309

(51) Int. Cl.
*G06F 9/00* (2006.01)
*G06F 1/00* (2006.01)
*G06F 1/12* (2006.01)
*G06F 7/04* (2006.01)
*G06F 1/26* (2006.01)

(52) U.S. Cl. .............. 713/193; 713/300; 713/400; 713/500; 726/16; 726/34

(58) Field of Classification Search .......... 713/193, 713/300, 400, 500; 726/16, 34
See application file for complete search history.

(56) References Cited

U.S. PATENT DOCUMENTS

| | | | | |
|---|---|---|---|---|
| 4,790,009 A | * | 12/1988 | Ishigaki et al. | 380/274 |
| 5,347,172 A | * | 9/1994 | Cordoba et al. | 327/536 |
| 5,404,402 A | * | 4/1995 | Sprunk | 713/189 |
| 5,710,508 A | * | 1/1998 | Watanabe | 323/284 |
| 6,014,749 A | * | 1/2000 | Gloor et al. | 713/300 |
| 6,172,494 B1 | * | 1/2001 | Feuser | 323/288 |
| 6,225,827 B1 | * | 5/2001 | Fujii et al. | 326/98 |

(Continued)

FOREIGN PATENT DOCUMENTS

DE 19907575 8/2000

(Continued)

OTHER PUBLICATIONS

Improving Smarcard Security Using Self-timed Circuit Technology Simon Moore, Ross Anderson & Markus Kuhnf University of Cambridge, Computer Laboratory European Commission (IST-1999-13515).*

*Primary Examiner*—Emmanuel L Moise
*Assistant Examiner*—Techane J Gergiso

(57) ABSTRACT

The invention relates to a method and an arrangement for increasing the security of circuits against unauthorized access, both of which can be used in particular to improve the security of cards, and particularly smart cards, against attacks in which the differential power analysis approach (DPA) is followed.

DPA is a procedure that makes it possible to obtain not only purely functional details but also internal information stored in integrated circuits (e.g. smart-card controllers). The majority of non-clocked classes of circuit have the property that the performance of the circuit adjusts automatically to the voltage available.

The invention adopts a new approach to enable integrated circuits and particularly non-clocked handshake logic to be protected against DPA. Advantage is taken in this case of a special property of self-timed logic by using a special power supply. As a result the processes in the self-timed logic take place in an unpredictable way and current consumption becomes affected by severe noise and DPA cannot be successfully applied.

11 Claims, 2 Drawing Sheets

U.S. PATENT DOCUMENTS

| | | | |
|---|---|---|---|
| 6,289,465 B1 * | 9/2001 | Kuemerle | 713/300 |
| 6,408,077 B1 * | 6/2002 | Prunier | 380/216 |
| 6,456,056 B1 * | 9/2002 | Katoh et al. | 324/76.41 |
| 6,518,791 B2 * | 2/2003 | Kojima et al. | 326/82 |
| 6,698,662 B1 * | 3/2004 | Feyt et al. | 235/492 |
| 6,737,816 B2 * | 5/2004 | Nakatsuka et al. | 315/291 |
| 6,748,535 B1 * | 6/2004 | Ryan et al. | 713/189 |
| 6,766,455 B1 * | 7/2004 | Ryan, Jr. | 713/189 |
| 6,965,995 B1 * | 11/2005 | Sato | 713/160 |
| 7,017,048 B2 * | 3/2006 | Schneider et al. | 713/194 |
| 7,205,794 B2 * | 4/2007 | Anderson et al. | 326/104 |
| 2001/0053220 A1 * | 12/2001 | Kocher et al. | 380/29 |
| 2002/0124178 A1 * | 9/2002 | Kocher et al. | 713/193 |
| 2003/0084336 A1 * | 5/2003 | Anderson et al. | 713/200 |
| 2004/0133585 A1 * | 7/2004 | Pautot | 707/102 |

FOREIGN PATENT DOCUMENTS

| | | |
|---|---|---|
| EP | 1098471 | 5/2001 |
| GB | 2345229 | 6/2000 |
| WO | WO0010124 | 2/2000 |
| WO | WO0019353 | 4/2000 |
| WO | WO0108088 | 2/2001 |

* cited by examiner

METHOD AND ARRANGEMENT FOR INCREASING THE SECURITY OF CIRCUITS AGAINST UNAUTHORIZED ACCESS

The invention relates to a method and an arrangement for increasing the security of circuits against unauthorized access, both of which can be used in particular for improving the security of cards, and especially smart cards, against attacks where the approach followed is to obtain information on the internal workings of an electrical circuit by measuring current or voltage consumption.

The development of microelectronics in the seventies made it possible for miniature computers of credit card format with no user interface to be produced. Computers of this kind are referred to as smart cards. In a smart card, a data memory and an arithmetic and logic unit are integrated into a single chip measuring a few square millimeters in size. Smart cards are used in particular as telephone cards and GSM SIM cards and in the banking field and in health care. The smart card has thus become a computing platform that we see wherever we turn.

Smart cards are currently regarded primarily as a safe and secure place for holding secret data and as a safe and secure platform for running cryptographic algorithms. The reason why the data and algorithms on the card are assumed to enjoy relatively high safety and security lies in the hardware construction of the card and in the interfaces that are run to the exterior. From the outside the card looks like a "black box", whose functions can only be accessed via a well-defined hardware and software interface and which can compel the observance of certain security policies. On the one hand, access to data can be linked to certain conditions. Access from outside to critical data, such as secret keys in a public key process for example, may even be totally barred. On the other hand a smart card is capable of running algorithms without it being possible for the execution of the individual operations to be observed from outside. The algorithms themselves may be protected on the card against being altered or read out. In an object-orientated sense, the smart card can be thought of as a type of abstract data that has a well-defined interface, that behaves in a specified way and that is itself capable of ensuring that certain integrity conditions are observed with regard to its state.

Essentially, there are two different types of smart card. Memory cards have simply a serial interface, addressing and security logic and ROM and EEPROM memories. Such cards perform only limited functions and are used for a specific application. This is why they are particularly cheap to produce. Smart cards produced in the form of microprocessor cards constitute, in principle, a complete general-purpose computer.

The process of manufacturing and supplying chip cards can be divided into the following phases:
  production of the chip,
  embedding of the chip,
  printing of the card
  personalization of the card
  issue of the card.

Each phase of the process is generally carried out by a company specializing in the particular operation. When the chips are being produced, care must be taken to ensure good security within the firm, particularly when the cards involved have hard-wired security logic. To enable the manufacturer to carry out a proper final test, the entire memory has to be freely accessible. Only after the final test is the chip made secure by means of a transport code. Thereafter, access to the card memory is possible only for authorized bodies that know the transport code. Hence there is no point in stealing brand-new chips. The authorized bodies may be card personalizers or issuers. No further making-secure functions are required for the embedding and printing operations. There is no need for the firms involved to know the transport code.

It is generally not the card manufacturer but the issuing body (e.g. a bank, telephone company, private or public health-care scheme) that puts the personal data into the card. This process is known as personalization and to perform it it is necessary to know the transport code.

The issue of the card, i.e. its movement from the issuing body to the card holder, poses another security problem. To be exact, it is only the issue of the card to the card holder in person in return for a signature and production of an identity card or other personal identification that is secure. It is true that sending out by post is often cheaper, but it is also not very secure. Another problem is notifying the card holder of the PIN number, in which case the same care has to be taken as with the card.

Because of the potentially dangerous security-related information held in the memories present in smart card controllers, not only do the above safeguarding steps have to be taken but additional protection also needs to be provided against the possible activities of hackers, which may cover every phase of the life of a smart card beginning with the manufacture of the card and extending through its transport and use to the manipulation of cards that have become unusable.

One possible way of gaining access to secret information is to apply so-called differential power analysis (DPA) to smart-card controllers, the object being to draw conclusions as to internal operations taking place in the smart-card controller by analyzing the power consumed. DPA is a new procedure that makes it possible to obtain not only purely functional details but also internal information stored in integrated circuits (e.g. smart-card controllers). The basis of this procedure is to analyze, in addition to the I/O signals, either the current consumption of the integrated circuit or the voltage peaks in the power supply while a given calculation is being carried out.

The analysis can be successfully performed when the number A of analog power traces $S(k, t)$ over time t (i.e. either current or voltage) with $k=\{1, \ldots, A\}$ different operands (which depend on the calculations) can be summed as follows:

$$T(i, t) = \sum_{k=1}^{A} p(i, k) \cdot S(k, t) \text{ with coefficients } p(i, k), i = \{0, 1, 2, \text{etc.}\}$$

A is typically 10,000. When considering different power traces $S(k_1,t_1)$, $S(k_2,t_1)$ and $S(K_3,t_1)$ at a given time $t=t_1$, differential power analysis can only successfully be applied if the integrated circuit is performing the same operation at these times whereas the operands for $k=\{1, \ldots, A\}$ are different. In other words, for successful DPA the same operation has to be carried out at the same time in all the power traces $S(k, t)$. For details see [1] and [2].

The invention relates to classes of circuit in which the operation or performance of the circuit adjusts automatically to the voltage available. The majority of non-clocked classes of circuit have this property and so too do many clocked ones. Examples of circuits of this kind having self-timed logic are:
  self-timed clocked circuits that obtain their timing by using an on-chip delay line, as described in [6] for example, non-clocked circuits having a self-timed data path, e.g. a double-rail data path, on which the validity of the data is encrypted into the data itself (see [4] and [5]), non-clocked circuits having a so-called "delay-matched" data path, and so-called "single-rail" circuits or circuits in which the data is bundled (see [3, 4, 5]).

What these three variants have in common is that the correct functional operation of the circuit is not dependent on the power supply available. The performance of the circuits will of course vary as a function of the variation in voltage.

Various procedures have been proposed to prevent secret data from being hacked by, in particular, making measurements of current consumption or the supply voltage.

Described in application laid open to public inspection DE 199 07 575 A1 is a circuit arrangement for supplying a feed current for an electronic circuit from a source of supply voltage, the circuit arrangement having a controllable current source arrangement that can be changed over between supplying a first and a second predetermined constant current, with the second constant current being higher than the first constant current, and whose input is connected to the source of supply voltage and whose output is connected to an energy storage element and to the electronic circuit, having a first reference-voltage source to provide a first reference voltage and a second reference voltage that is higher than the first, and having a comparator arrangement to compare a feed voltage, which voltage is generated at the electronic circuit and the energy storage element by the supply of the feed current, with the first and second reference voltages and to change over the current source arrangement to the first constant current if the feed voltage exceeds the second reference voltage and to the second constant current if the feed voltage is below the first reference voltage.

What is achieved by this process is that the feed current and supply voltage to the electronic circuit do not depend on the operations taking place within the electronic circuit. Use is not made in this case of a change in the timing of the processor and instead a complicated and expensive circuit is required.

Described in European patent application EP 1 098 472 A2 is an encrypting device and its application that reduce susceptibility to DPA. In this case a coding key having a first function is transformed, thus generating a first temporary key as a function of a random number. A message is encrypted with this temporary key, thus generating a message of a changed form. This changed message is transformed by a second function in order to encrypt it in this way. This encryption is identical to a direct encryption using the un-transformed key. The temporary key is constantly varied to prevent DPA.

Another system that is intended to prevent attacks being made by DPA is disclosed in GB patent application 2,345,229 A. Here it is a question of encrypting a message by using an algorithm for block ciphering. Blocks of messages are combined with blocks of keys. In each encrypting operation or iteration stage the way in which the blocks are combined is varied. It is advantageous for the combination to be varied randomly.

A disadvantage of this method is that the data becomes accessible when the code is being decrypted.

Increasing card security for chip cards by using a coil on the card is described in WO 00/10124 A1. The coils prevent voltage peaks from being illicitly detected. This method can be applied both to contactless cards and to contact cards.

The correlation between corresponding signal waveforms is not destroyed but merely blurred.

A further measure is put forward in international patent application WO 00/19353 A1. What is described is a data carrier, and particularly a chip card, having a data-processing unit and at least one contactless interface via which the data-processing unit can be coupled to a read/write unit for the exchange of data signals and for the pick-up of electrical energy to operate the data-processing unit, wherein the data-processing unit is constructed at least predominantly from logic modules that are operated in an at least largely non-clocked manner.

International patent application WO 01/08088 A1 presents a microcontroller that is protected against attacks aimed at determining information in an unauthorized way from the current consumption of the microcontroller. This microcontroller may for example be incorporated in a chip card. As well as the usual items such as a contact for the supply voltage (VCC), a contact for inputting and outputting, a processor and a memory, the microcontroller also comprises a means that is used to vary the supply voltage to the processor.

However, since even non-clocked logic produces correlatable power traces, the measures described have to be backed up by further protective precautions to enable DPA to be successfully prevented.

It is therefore an object of the invention to specify a method and an arrangement of the generic kind by means of which the disadvantages of the conventional protective measures are overcome and in particular the obtaining of information on the internal workings of an electrical circuit by measuring its current or voltage consumption is prevented.

In accordance with the invention, this object is achieved by means of a collaborative association of the features in the characterizing clauses of claims 1 and 7 with the features in the preambles. Advantageous embodiments of the invention are detailed in the subclaims.

A particular advantage of the method of increasing the security of circuits against unauthorized access is that signal traces produced by data-processing operations in self-timed circuits are decoupled.

An arrangement for increasing the security of circuits against unauthorized access is distinguished by the fact that a controllable device for current regulation is connected between the power supply of a self-timed circuit and the self-timed circuit itself.

In a preferred embodiment of the method according to the invention, provision is made for the decoupling of the signal traces to be achieved by varying the clock frequency of the self-timed circuit or of individual functional units in the self-timed circuit over time. It is advantageous in this case if the variation over time of the clock frequency is obtained by varying the supply current over time. Alternatively, it is equally possible for the variation over time of the clock frequency to be obtained by varying the supply voltage over time.

As well as this, provision is also made in a preferred embodiment of the method according to the invention for the variation over time of the supply current or supply voltage to be controlled by a random number generator.

It is found to be advantageous for the variation over time of the supply current or supply voltage to be performed by means that are part of a read/write device for chip cards and in which is included the self-timed circuit on a chip card, and particularly a smart card, that is fed with the current that varies over time or that is supplied with the voltage that varies over time.

In a preferred embodiment of the arrangement according to the invention, provision is made for the device for regulating current to be connected to a random number generator via a D/A converter.

In a preferred embodiment of the arrangement according to the invention, the self-timed circuits are in the form of non-clocked handshake logic. It is equally possible for the self-timed circuits to take the form of clocked circuits that have an on-chip delay line.

An advantage of the arrangement according to the invention is that the self-timed circuit is part of a smart-card controller.

It is also advantageous for the controllable device for current regulation and, where required, the random number generator and the D/A converter to be part of a read/write device for chip cards.

The invention adopts a new approach to enable integrated circuits that employ self-timed logic, and particular non-clocked so-called handshake logic, to be protected against DPA. Advantage is taken in this case of a special property of self-timed logic by using a special power supply. As a result the processes in the self-timed logic take place in an unpredictable way and current consumption becomes affected by severe noise and DPA cannot be successfully applied.

There are advantages to the invention in particular in the fact that only a few additional components are required to give a broader span of protection to integrated circuits.

Compared with the ideas expressed hitherto of how susceptibility to DPA can be reduced, the present invention is a new approach that at least assists or boosts other countermeasures against DPA. A noteworthy aspect of the new approach is that, compared with most of the other proposals, it is cheap and easy to implement. The fluctuating supply voltage allows the self-timed logic to run faster or slower as the case may be. When the voltage supplied is low, the self-timed logic runs more slowly than it would at a mean voltage level. The invention takes advantage of this effect by controlling the voltage supply and hence the calculating performance, which latter shifts the phases of calculation. The result is that correlation with the phases of calculation in any power trace is no longer possible.

The strength of the invention thus lies in the fact that it becomes considerably more difficult to correlate signal patterns, e.g. the pattern of voltage peaks over time, with a given data-processing operation. It can therefore be assumed that the number of attempts to obtain measurements that will allow DPA to be successfully applied will rise to an extraordinarily high figure compared with a constant voltage or current supply.

These and other aspects of the invention are apparent from and will be elucidated with reference to an embodiment described hereinafter.

The most important part of the invention is the exploitation of the automatic adjustment of the performance of the circuit or of certain logic blocks in such a way that it becomes considerably more difficult to assign the temporally distributed current peaks to a data-processing operation or a calculation that is being carried out at the time concerned.

Figure 1:
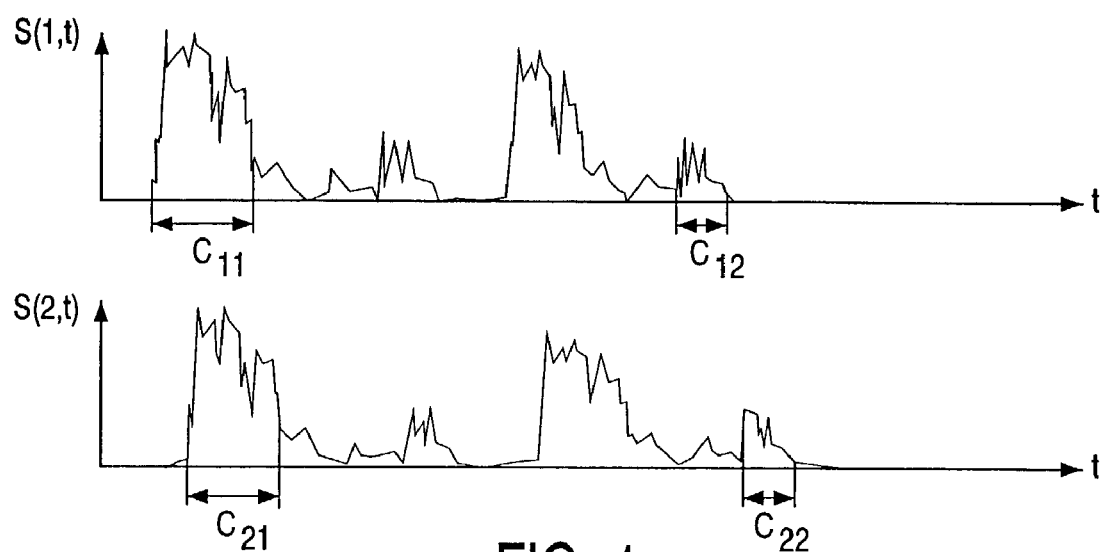
FIG. 1 shows two examples of power traces S(1, t) and S(2, t).

The idea behind the invention is to destroy the correlation between the power traces associated with a data-processing operation. FIG. 1 shows two different power traces. For successful DPA it is very important that the individual power traces can be lined up with one another in such a way that the time segments occupied by corresponding phases of calculation in different power traces are the same (e.g. that C11 corresponds to C21). Under this condition a sum T(i, t) reveals secret information (see above). In FIG. 1 the phases of calculation do not correspond. $C_{11}$ does not match up with $C_{21}$, and $C_{12}$ does not match up with $C_{22}$.

If no steps are taken to counteract DPA, even self-timed logic will produce correlatable power traces. What this means is that the corresponding phases of calculation match up with one another and the summing to form T(i, t) can be successfully applied.

Figure 2:
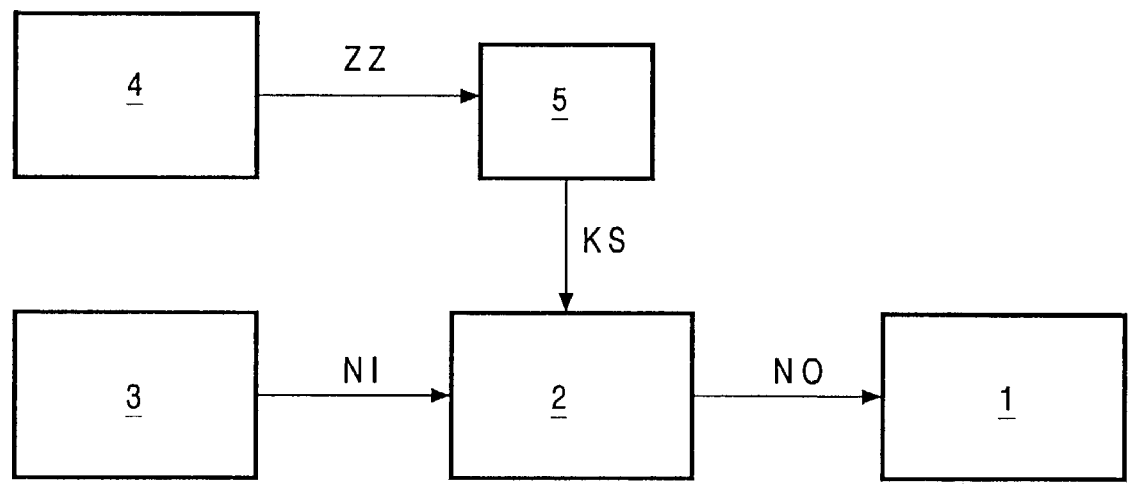
FIG. 2 is a block circuit diagram of a power supply device for self-timed circuits that is fitted with a current regulator.

When used in conjunction with the following special power supply, the behavior of self-timed logic becomes significantly different. FIG. 2 shows self-timed logic 1 that is supplied with a voltage that is fed to it from an external power supply 3 via a current regulator 2. The supply voltage to the self-timed logic varies over time. The variations are controlled by a random number generator 4 that is connected to the current regulator 2 via a digital-to-analog converter 5. This digital-to-analog converter 5 converts the digital random numbers into analog control signals that produce a fluctuating supply voltage. In FIG. 2, the reference numbers and letters used are as follows:

1 Self-timed logic
2 Current regulator
3 External power supply
4 Random number generator
5 Digital-to-analog converter
ZZ Random numbers
KS Control signal
NI Incoming supply voltage at the input to the current regulator 2
NO Outgoing supply voltage at the output from the current regulator 2

Figure 3:
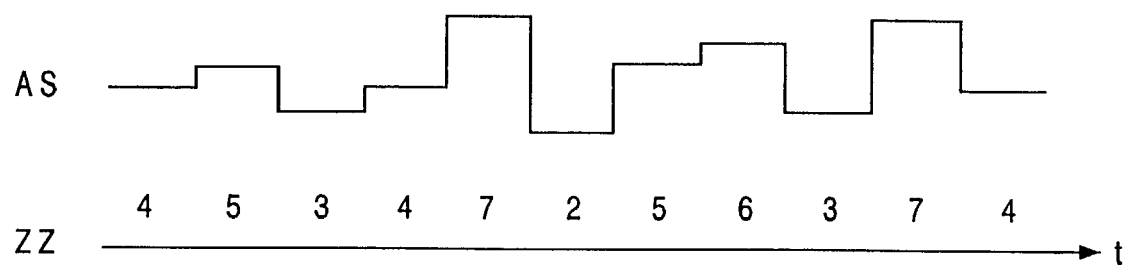
FIG. 3 shows current regulation by means of random numbers.

FIG. 3, in which an output voltage AS is shown plotted against the random numbers ZZ, shows an example of how the randomly generated data control the supply voltage. The desired effect is that the fluctuating supply voltage causes the self-timed logic to run faster or slower as the case may be. When the voltage supplied is low, the self-timed logic runs slower than when it is at a mean level. The invention takes advantage of this effect by controlling the voltage supply and hence the calculation performance, which latter causes a shift in the phases of calculation. The result is that correlation with the phases of calculation within any power trace is no longer possible.

The invention is not limited to the embodiments shown and described here. By combining and modifying the means and features mentioned it is in fact possible to produce other variant embodiments without thereby exceeding the scope of the invention.

REFERENCES

[1] "Introduction to Differential Power Analysis and Related Attacks". P. Kocher, J. Jaffe, B. Jun. Available from http://www.cryptographv.com/dpa/technical
[2] "Differential Power Analysis" P. Kocher, J. Jaffe, B. Jun. Advances in Cryptology: Proceedings of Crypto '99, Springer-Verlag, 1999, pp. 388-397
[3] "The Tangram Framework: Asynchronous Circuits for Low Power", J. Kessels and A. Peeters. Proceedings of ASPDAC, February 2001, pp. 255-260
[4] "Applications of Asynchronous Circuits", C. H. van Berkel, M. B. Josephs and S. M. Nowick. Proceedings of the IEEE, 87 (2), February 1999, pp. 223-233

[5] "Low-Power Operation Using Self-Timed Circuits and Adaptive Scaling of Supply Voltage", L. Nielsen, C. Niessen, J. Sparso and K. van Berkel. IEEE Transactions on VLSI Systems, December 1994, pp. 391-397

[6] "An Efficient Controller for Variable Supply-Voltage Low Power Processing", V. Gutnik and A. Chandrakasan. Symposium on VLSI Circuits, Digest of Technical Papers, 1996, pp. 158-159

The invention claimed is:

1. A method of increasing security of circuits against unauthorized access, comprising:

receiving an input power supply signal;

producing an output power supply signal that varies over time using the input power supply signal in response to control signals;

providing the output power supply signal that varies over time to a self-timed circuit;

performing data-processing operations at the self-timed circuit using the output power supply signal that varies over time in response to the control signals, the data-processing operations being performed at different clock frequencies due to the output power supply signal that varies over time to decouple signal traces associated with the data-processing operations so that security of the self-timed circuit is increased; and generating random numbers to produce the control signals to vary the output power supply signal over time;

converting the random numbers from digital random number signals to analog random number signals, the analog random number signals being used as the control signals to vary the output power supply signal over time; and wherein the self-timed circuit is part of a smart card and wherein the producing the output power supply signal is performed by means that are part of a read/write device for the smart card.

2. The method as claimed in claim 1, wherein the producing the output power supply signal includes varying the output power supply signal with respect to current so that supply current that varies over time is provided to the self-timed circuit as the output power supply signal.

3. The method as claimed in claim 1, wherein the producing the output power supply signal includes varying the output power supply signal with respect to voltage so that supply voltage that varies over time is provided to the self-timed circuit as the output power supply signal.

4. A system for increasing the security of circuits against unauthorized access, comprising:

a regulator configured to receive an input power supply signal and to produce an output power supply signal that varies over time using the input power supply signal in response to control signals;

a self-timed circuit connected to the regulator to receive the output power supply signal from the regulator, the self-timed circuit being configured to perform data-processing operations using the output power supply signal that varies over time in response to the control signals, the data-processing operations being performed at different clock frequencies due to the output power supply signal that varies over time to decouple signal traces associated with the data-processing operations so that security of the self-timed circuit is increased;

a random number generator configured to generate random numbers that are used to produce the control signals applied to the regulator to vary the output power supply signal from the regulator over time;

a digital-to-analog converter connected between the random number generator and the regulator, the digital-to-analog converter being configured to convert the random numbers from digital random number signals to analog random number signals, the analog random number signals being used as the control signals applied to the regulator to vary the output power supply signal from the regulator over time;

wherein the random number generator and the digital-to-analog converter are part of a read/write device for a smart card; and wherein the self-timed circuit is part of the smart card.

5. The system as claimed in claim 4, wherein the regulator is a current regulator.

6. The system as claimed in claim 4, wherein the regulator is configured to vary the output power supply signal with respect to current according to the control signals so that supply current that varies over time is provided to the self-timed circuit as the output power supply signal.

7. The system as claimed in claim 4, wherein the regulator is configured to vary the output power supply signal with respect to voltage according to the control signals so that supply voltage that varies over time is provided to the self-timed circuit as the output power supply signal.

8. The system arrangement as claimed in claim 4, wherein the self-timed circuit is in the form of a non-clocked handshake logic.

9. The system as claimed in claim 4, wherein the self-timed circuit is in the form of a non-clocked circuit that has an on-chip delay line.

10. The system as claimed in claim 4, wherein the self-timed circuit is part of the smart-card controller.

11. The system as claimed claim 4, wherein the regulator is part of the read/write device for smart card.

* * * * *